(12) United States Patent
Kim et al.

(10) Patent No.: US 7,773,267 B2
(45) Date of Patent: Aug. 10, 2010

(54) PRINTING APPARATUS HAVING SCANNER FUNCTION

(75) Inventors: Young-min Kim, Suwon-si (KR);
Byung-sun Ahn, Suwon-si (KR);
Sang-cheol Park, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 948 days.

(21) Appl. No.: 10/933,376

(22) Filed: Sep. 3, 2004

(65) Prior Publication Data

US 2005/0134929 A1    Jun. 23, 2005

(30) Foreign Application Priority Data

Dec. 17, 2003    (KR) ..................... 10-2003-0092509

(51) Int. Cl.
*H04N 1/04* (2006.01)
(52) U.S. Cl. ..................... 358/296; 358/474; 358/401; 399/110; 399/124; 399/125
(58) Field of Classification Search ............... 399/407, 399/110, 124, 125; 346/160; 400/642; 270/53; 358/474, 401, 497, 296
See application file for complete search history.

(56) References Cited

U.S. PATENT DOCUMENTS

| | | | |
|---|---|---|---|
| 3,894,175 A * | 7/1975 | Zaffignani et al. ......... 178/2 R |
| 4,727,387 A * | 2/1988 | Israely ..................... 347/139 |
| 4,993,697 A * | 2/1991 | Yamashita et al. ....... 270/58.17 |
| 5,157,416 A * | 10/1992 | Kinoshita et al. ........... 347/263 |
| 5,564,847 A * | 10/1996 | Patrick et al. .............. 400/642 |
| 6,181,884 B1 * | 1/2001 | Isogai et al. ................. 399/1 |
| 6,462,839 B1 * | 10/2002 | Short ...................... 358/474 |
| 6,511,241 B2 * | 1/2003 | Fetherolf et al. .......... 400/664 |
| 7,120,383 B2 * | 10/2006 | Sato et al. ................. 399/407 |

FOREIGN PATENT DOCUMENTS

| | | | | |
|---|---|---|---|---|
| JP | 11-215314 | | | 8/1999 |
| JP | 11-255403 | | | 9/1999 |
| JP | 2000-22868 | | | 1/2000 |
| JP | 2000175060 | A | * | 6/2000 |
| JP | 2003-15500 | | | 1/2003 |
| KR | 00184225 | | | 12/1998 |
| KR | 2001-3543 | | | 1/2001 |
| KR | 010003543 | A | | 1/2001 |

* cited by examiner

*Primary Examiner*—King Y Poon
*Assistant Examiner*—Jamares Washington
(74) *Attorney, Agent, or Firm*—Stanzione & Kim LLP (57) ABSTRACT

A printing apparatus having a scanner function. The printing apparatus includes: a printing unit to print an image according to an electro-photographic method; a scanning unit which reads image information from a document sheet, and is installed at the upper side of the printing unit to be able to pivot in upward/downward direction; and an upper cover to cover the upper side of the printing unit, wherein the upper cover is pivoted together with the scanning unit so as to open the upper side of the printing unit.

23 Claims, 6 Drawing Sheets

PRINTING APPARATUS HAVING SCANNER FUNCTION

CROSS-REFERENCE TO RELATED APPLICATIONS

This application claims the priority of Korean Patent Application No. 2003-92503, filed on Dec. 17, 2003, in the Korean Intellectual Property Office, the disclosure of which is incorporated herein in its entirety by reference.

BACKGROUND OF THE INVENTION

1. Field of the Invention

The present general inventive concept relates to a printing apparatus, and more particularly, to a printing apparatus having an image input function (a scanner function) and an image output function (a printing function) using an electro-photographic method.

2. Description of the Related Art

A basic function of a printing apparatus is to print images on paper. The printing apparatus may have one or more additional functions, for example, a scanner function to read image information, a copy function, a facsimile function, etc. Such a printing apparatus having more than one additional function, in addition to the printing function, is referred to as a multi-functional printer. The multi-functional printer having a printing function and an additional function can be referred to in different ways depending on the additional function. Throughout the specification, an apparatus comprising a printing unit printing images on paper and a scanning unit reading image information is referred to as a printing apparatus. When a printing apparatus has the printing unit and the scanning unit, the printing apparatus may have basically the functions of a printer, a scanner, and a copier. Since the scanning unit can function as an input portion of a facsimile, and the printing unit can function as an output portion of the facsimile, the printing apparatus may have a function of the facsimile when being provided with a line control unit (LCU).

In the printing apparatus having the scanner function, the scanning unit is generally installed at an upper side of the printing unit. A photosensitive drum and a developing device which are used in the printing unit are consumables, and, therefore, must be replaced with new ones when they reach ends of their service lives. Since the scanning unit is positioned at the upper side of the printing unit, a side cover or a front cover of the printing unit must be opened in order to replace consumables with new ones. Recently, as printing apparatuses have been supplied to personal users, the size of the printing apparatus is inclined to be gradually smaller. In particular, as the height of the printing apparatus has been reduced gradually, the size of the side cover or the front cover also tends to be gradually smaller. Therefore, even when the side cover or the front cover is opened, it is difficult for a user to separate/attach the developing device from/to the printing unit by hand. In order to solve this problem, a method may be considered in which rails are installed at the printing unit for the developing device to be able to slide on the rails, and after the developing device is caused to lie on the rails, the developing device is inserted into or is extracted from the printing unit. However, in this case, there is a problem in which the manufacturing cost thereof increases. In addition, when a printing medium jam occurs during printing, the jammed printing medium can be removed after the side cover or the front cover is opened, and the developing device is extracted. However, even when the developing device can be easily extracted from the printing unit provided with the rails, there is a problem in which since it is hard to put a user's hand into the printing unit, the jammed medium is not easily removed.

SUMMARY OF THE INVENTION

To solve the above-described problems, it is an aspect of the present general inventive concept to provide a printing apparatus having a scanner function which is improved so that a space to gain access to the inside of a printing unit so as to replace consumables with new ones and to remove a jammed printing medium can be secured to a maximum extent.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a printing apparatus having a scanner function including: a printing unit to print an image according to an electro-photographic method; a scanning unit which reads image information from a document sheet, and is installed at the upper side of the printing unit to be able to pivot in upward/downward direction; and an upper cover to cover the upper side of the printing unit, wherein the upper cover is pivoted together with the scanning unit so as to open the upper side of the printing unit.

The scanning unit may be installed so that the lower surface of the scanning unit can be spaced upward a predetermined distance from the upper cover. Then, a space between the lower surface of the scanning unit and the upper surface of the upper cover forms a discharged-medium stacking portion at which recording mediums discharged from the printing unit are stacked, and the transfer path of a recording medium has a "U" shape. In this case, a plurality of guide ribs may be formed at the lower surface of the scanning unit so as to guide a recording medium discharged from the printing unit.

The printing unit may include: a process cartridge including a photosensitive drum, a charging device, and a developing device; an exposure device to scan the photosensitive drum with light to form an electrostatic latent image; a transfer device installed to face the photosensitive drum; and a fixing device to fix an image onto a recording medium, and the exposure device is installed at the upper cover. Then, the exposure device pivots together with the upper cover.

The scanning unit may be installed at the upper side of the printing unit without an in-between space, and the lower cover of the scanning unit additionally serves as the upper cover. In this case, a discharged-medium stacking portion at which recording mediums discharged from the printing unit may be installed at a side of the printing unit in a vertical type. Then, the transfer path of a recording medium has an "L" shape.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
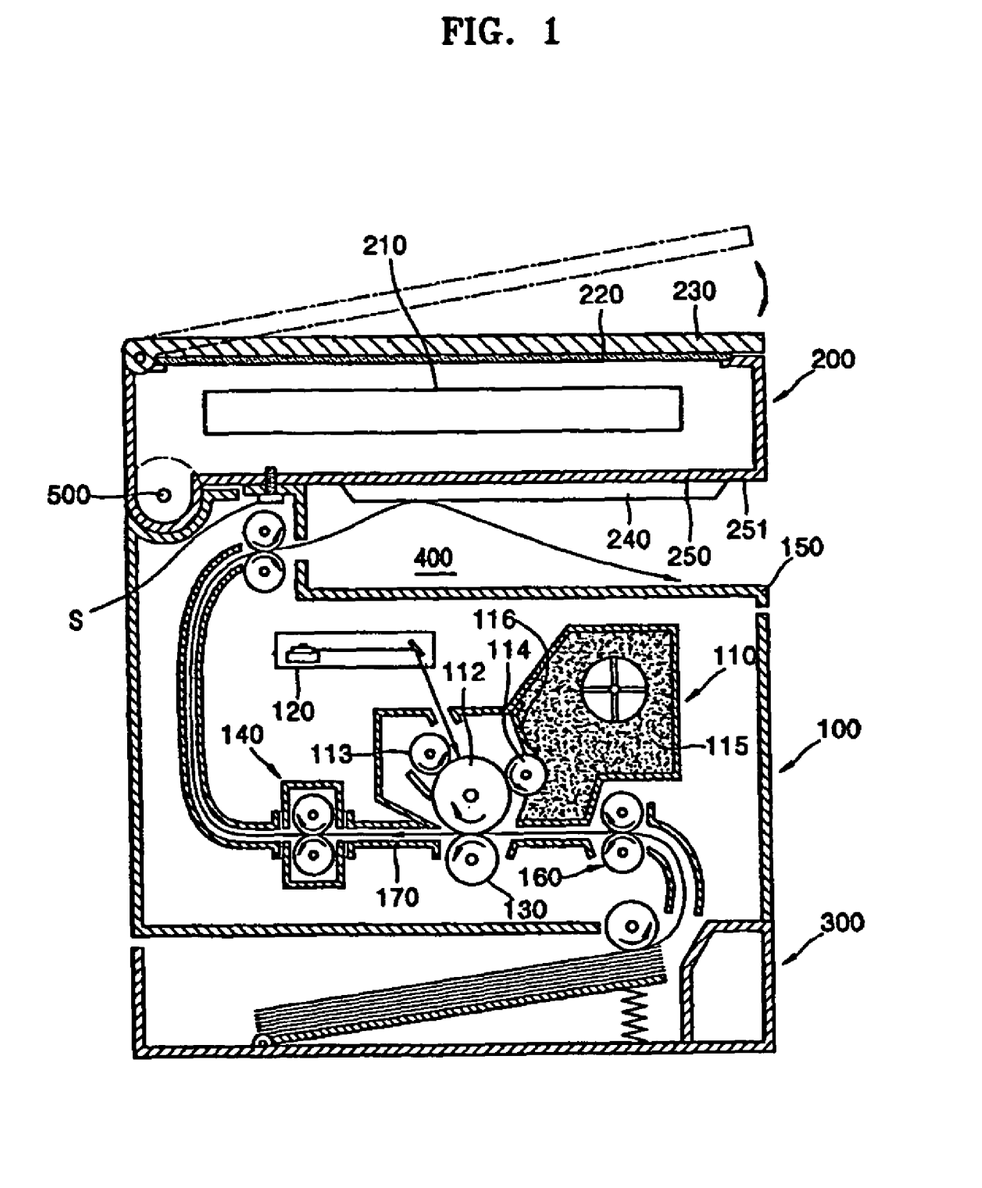
FIG. 1 is a structural diagram illustrating a printing apparatus according to an embodiment of the present general inventive concept.
Figure 2:
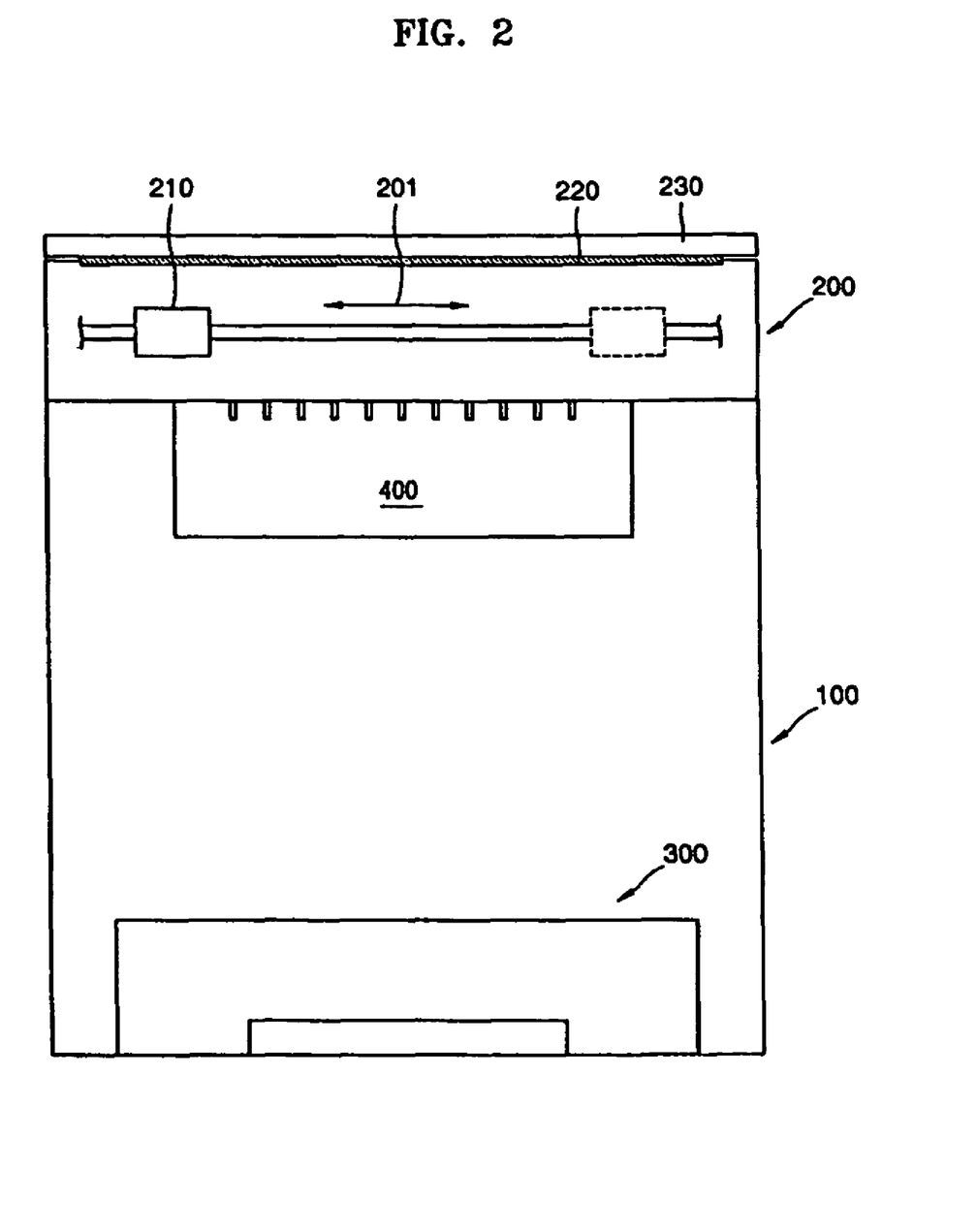
FIG. 2 is a front view illustrating the printing apparatus shown in FIG. 1.
Figure 3:
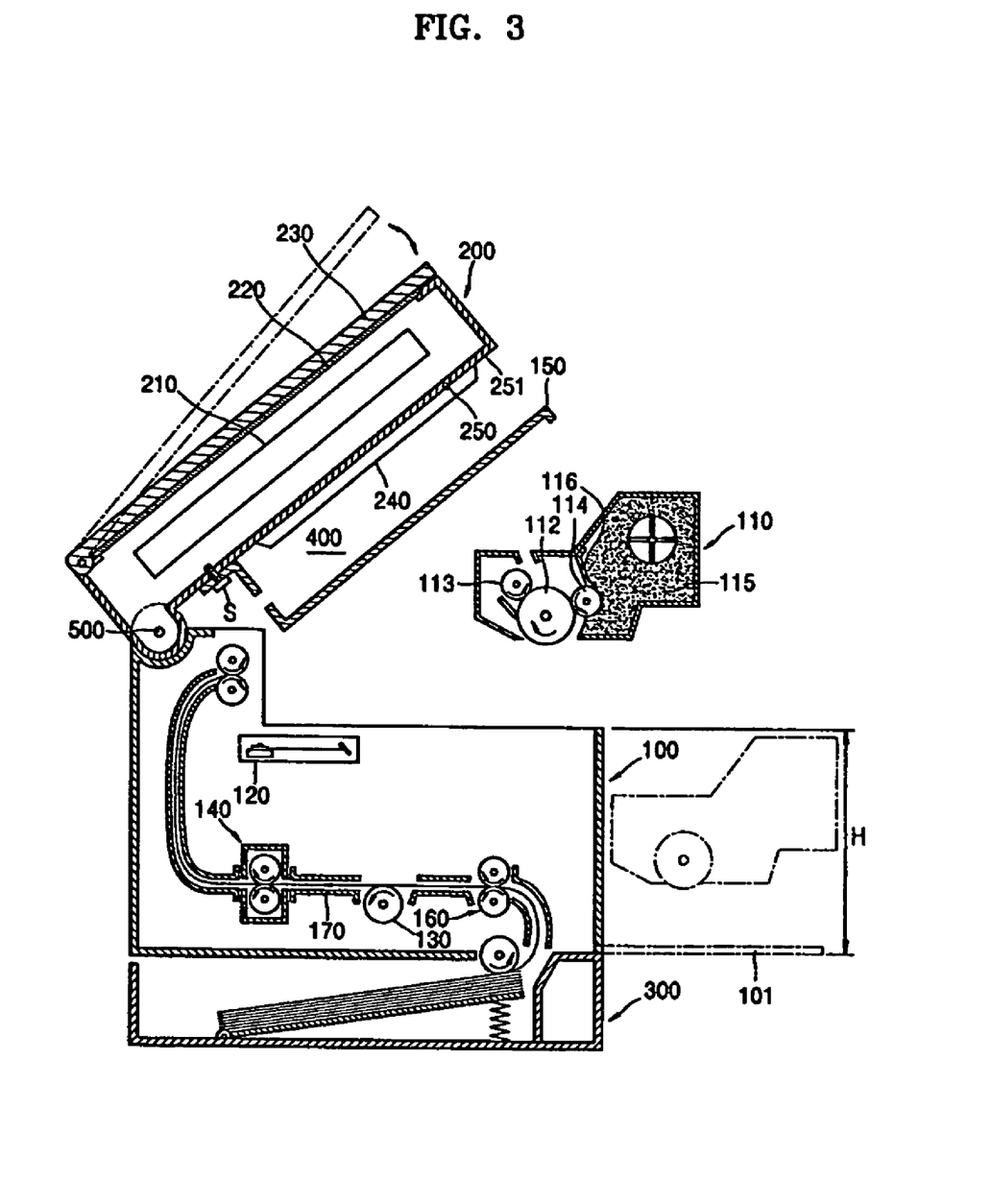
FIG. 3 is a diagram illustrating the operation of the printing apparatus shown in FIG. 1.

FIG. 1 is a structural diagram illustrating a printing apparatus according to an embodiment of the present general inventive concept, FIG. 2 is a front view illustrating the printing apparatus shown in FIG. 1, and FIG. 3 is a diagram illustrating the operation of the printing apparatus shown in FIG. 1.

Referring to FIGS. 1 and 2, a printing unit 100 to print an image on a recording medium and a scanning unit 200 to read image information, are shown.

The printing unit 100 of this embodiment prints an image on a recording medium according to an electro-photographic method. Referring to FIG. 1, a photosensitive drum 112, a charging device 113, a developing roller 114, an exposure device 120, a transfer device 130, and a fixing device 140 are shown. The charging device 112 charges the circumferential surface of the photosensitive drum 112 to a uniform potential. The exposure device 120 scans the photosensitive drum 112 with light according to image information. An electrostatic latent image is formed on the surface of the photosensitive drum 112 according to potential differences between scanned portions and not-scanned portions. The developing roller 114 forms a toner image by supplying toner to the electrostatic image. Reference numeral 116 denotes a regulating unit to regulate the thickness of toner attached to the developing roller 114. A recording medium supplied from a recording medium feeding unit 300 is moved between the photosensitive drum 112 and the transfer device 130. A transfer bias is applied to the transfer device 130. The toner image is detached from the photosensitive drum 112 and is attached to a recording medium by the transfer bias. The fixing device 140 applies heat and pressure to the toner image and causes the toner image to be fixed on the recording medium. The printing unit 100 in this embodiment uses a process cartridge 110 including the developing roller 114, a toner containing portion 115 to contain toner, the photosensitive drum 112, and the charging device 113.

The scanning unit 200 of this embodiment has a reading unit 210 to read image information by illuminating light on a document sheet, and detecting the reflected light from the document sheet. A contact image sensor (CIS), a charge coupled device (CCD), or the like can be used as the reading unit 210. The scanning unit 200 of this embodiment can be a flat-bed-type scanning unit in which the reading unit 210 is moved for the reading operation. Reference numeral 220 denotes a document sheet bed which is made of a transparent material and on which a document sheet is laid. Reference numeral 230 denotes a cover to cover the document sheet bed 220. The reading unit 210 reads image information from the document sheet while being moved in the directions of arrow 201 in FIG. 2.

Referring to FIGS. 1 and 2, the scanning unit 200 is positioned at an upper side of the printing unit 100. With the above configuration, the footprint of the printing apparatus can be reduced. The recording medium feeding unit 300, on which recording mediums to be supplied to the printing unit 100 are stacked, is installed at the lower side of the printing unit 100. The scanning unit 200 is spaced a predetermined distance upward from the printing unit 100. A space between an upper cover 150 covering the upper side of the printing unit 100 and a lower surface 251 of the scanning unit 200 forms a discharged medium stacking portion 400 on which recording mediums discharged from the printing unit 100 are stacked. Since the discharged-medium stacking portion 400 is disposed between the scanning unit 200 and the printing unit 100, the transfer path of a recoding medium picked up from the recording medium feeding unit 300 has nearly a "U" shape. With the above configuration, the space to transfer a recording medium does not transgress the footprint of the printing apparatus.

As shown in FIG. 1, guide ribs 240 to guide a recoding medium discharged from the printing unit 100 may be provided at the lower surface 251 of the scanning unit 200. Undesired projections (not shown) may be formed at the lower surface 251 of the scanning unit 200 during the manufacturing process of the scanning unit 200, such as an injection molding process. A recording medium discharged from the printing unit 100 is moved toward the lower surface 251 of the scanning unit 200. At this time, the projections would normally interfere with the recording medium, and a recording medium jam may occur. The guide ribs 240 are formed to project from the lower surface 251 of the scanning unit 200, and guide the recording medium so that the recording medium can be smoothly discharged. In addition, since the recording medium is just recently passed through the fixing device 140 at a high temperature, the recording medium discharged from the printing unit 100 is at a high temperature. The guide ribs 240 have an additional role in which the guide ribs 240 cause the recording medium to not directly touch the lower surface 251 of the scanning unit 200.

When image information is inputted into the printing apparatus from a computer (not shown) or the scanning unit 200, a recording medium stacked on the recording medium feeding unit 300 is supplied to the printing unit 100. The photosensitive drum 112 charged by the charging device 113 to a uniform potential is scanned by light from the exposure device 120 corresponding to image information, and an electrostatic latent image is formed on the surface of the photosensitive drum 112. The developing roller 114 supplies toner contained in the toner containing portion 115 to the electrostatic latent image and develops the electrostatic latent image. When the recording medium is introduced into a transfer nip portion at which the transfer device 130 and the photosensitive drum 112 face each other, the toner image is transferred onto the recording medium by a transfer bias applied to the transfer device 130. When the recording medium is passed through the fixing device 140, the toner image is fixed on the recording medium by heat and pressure. The recording medium completing a printing process is discharged to the discharged-medium stacking portion 400 disposed between the scanning unit 200 and the printing unit 100. The printing function and the document copying function can be realized by the above procedures. In addition, image information inputted by the scanning unit 200 may be transferred to a computer by a predetermined interface unit. Furthermore, since the scanning unit 200 can function as an input portion of a facsimile, and the printing unit 100 can function as an output portion of the facsimile, a combined printing apparatus further having a facsimile function can be realized when the printing apparatus further comprises a line control unit (LCU).

The scanning unit 200 is installed to be able to pivot on a hinge 500. The printing apparatus according to this embodiment is characterized in that when the scanning unit 200 is pivoted in order to open the upper side of the printing unit 100, the upper cover 150 to cover the upper side of the printing unit 100 is pivoted together with the scanning unit 200. To this end, the upper cover 150 is joined to the scanning unit 200. As an example, the upper cover 150 of this embodiment is joined to a lower cover 250 of the scanning unit 200 with screws S.

As indicated by dotted lines in FIG. 3, when the side cover 101 is opened, the process cartridge 110 is laterally attached/detached to/from the printing unit 100, but the height H of the opened area is low, and therefore it would not normally (conventionally) be easy to attach/detach the process cartridge 110 to/from the printing unit 100. In addition, since the process cartridge 110 is slid in a lateral direction and is attached/detached to/from the printing unit 100, the attachment/detachment distance for attaching/detaching the process cartridge 110 to/from the printing apparatus 100 is normally long, and there is normally a possibility in which the photosensitive drum 112 may interfere with parts installed in the printing unit 100, including feed rollers 160, and therefore may normally be damaged. Further, since a user's hand cannot reach the innermost portion of the printing unit, it would normally not be easy to remove a jammed medium. Furthermore, the side cover 101 may be opened undesirably. When the side cover 101 is opened during a printing job, the printing job is stopped.

However, in the printing apparatus of this embodiment, the upper side of the printing apparatus is also opened so that the process cartridge 101 can be easily attached/detached to/from the printing unit 100, and, in addition, a user can easily gain access to the inner portions of the printing unit 100 to remove a jammed printing medium. As shown in FIG. 3, when the scanning unit 200 is pivoted, the upper side of the printing unit 100 is opened while the upper cover 150 joined to the scanning unit 200 is pivoted together with the scanning unit 200. The user gains access to the process cartridge 110 through the opened upper side. Since the process cartridge 110 is attached/detached to/from the printing unit 100 nearly in upward/downward directions, the possibility in which the process cartridge 110 may interfere with other parts in the printing unit 100 during the attachment and detachment operations can be reduced markedly. Since the attachment/detachment distance for attaching/detaching the process cartridge 110 to/from the printing apparatus 100 is short, and the operation space for attaching/detaching the process cartridge 110 to/from the printing apparatus 100 is sufficient, additional attachment/detachment structures, such as a rail structure (not shown) and the like for attaching/detaching the process cartridge 110 to/from the printing apparatus 100, can be omitted. Therefore, in the aspect of manufacturing cost, the printing apparatus of this embodiment is advantageous. In addition, since the user can easily gain access to a recoding medium transfer path 170 opened by removing the process cartridge 110, a jammed medium can be removed very easily. Since the relatively heavy scanning unit 200 is pivoted in a direction opposite to the direction of gravity in order to open the printing unit 100, there is almost no possibility in which the printing unit 100 is opened undesirably.

Figure 4:
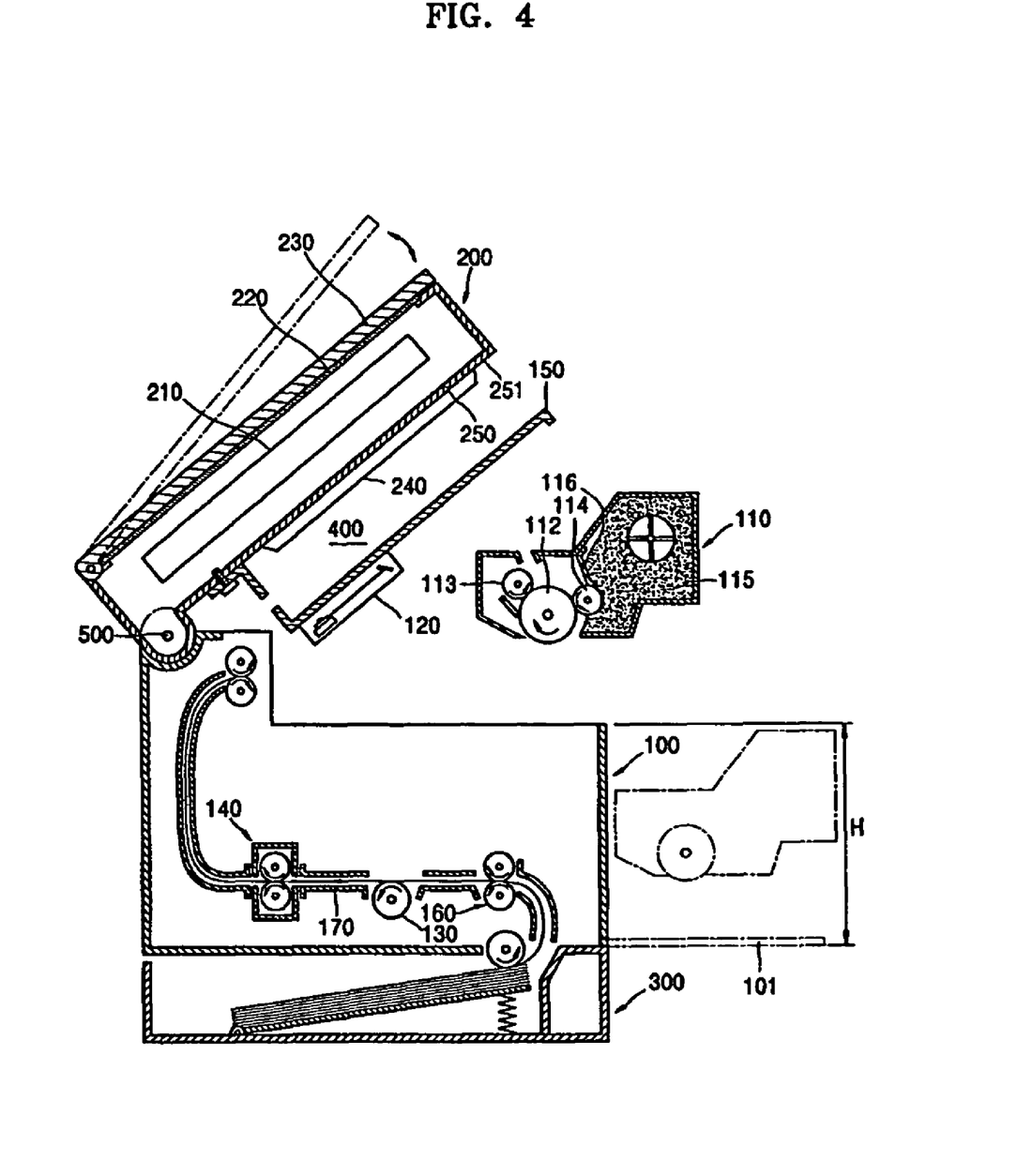
FIG. 4 is a structural diagram illustrating a printing apparatus according to another embodiment of the present general inventive concept.

FIG. 4 is a structural diagram illustrating a printing apparatus according to another embodiment of the present general inventive concept.

Referring to FIG. 4, an exposure device 120 is joined to an upper cover 150. When a scanning unit 200 is pivoted, the exposure device 120 is pivoted together with the scanning unit 200, and nearly all the upper side of a printing unit 100 is opened. Therefore, a process cartridge 110 is attached/detached to/from the printing unit 100 very conveniently, and when the process cartridge 110 is removed, all of a recording medium transfer path 170 is opened, and therefore, a jammed medium can be removed more easily.

Figure 5:
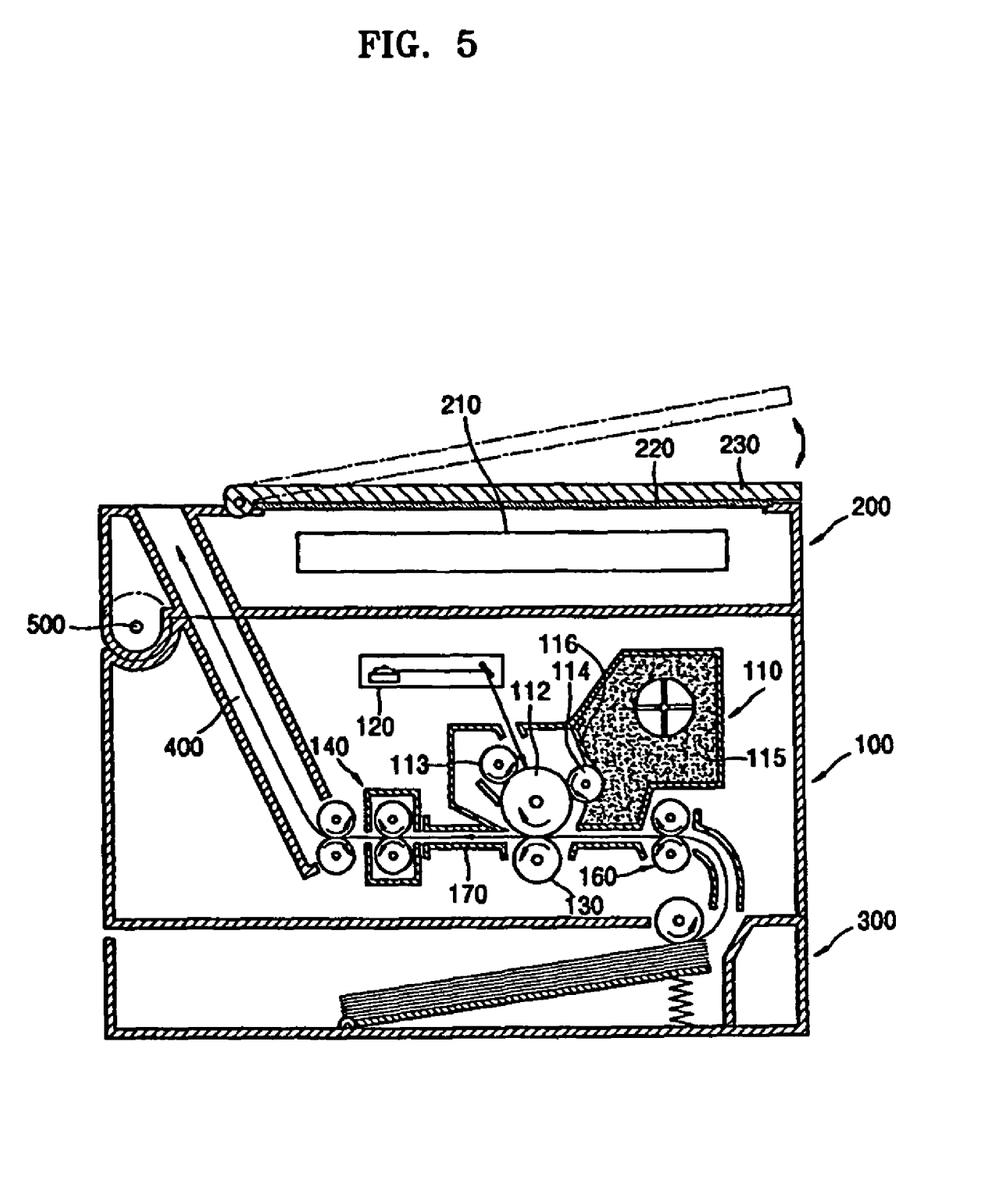
FIG. 5 is a structural diagram illustrating a printing apparatus according to still another embodiment of the present general inventive concept.
Figure 6:
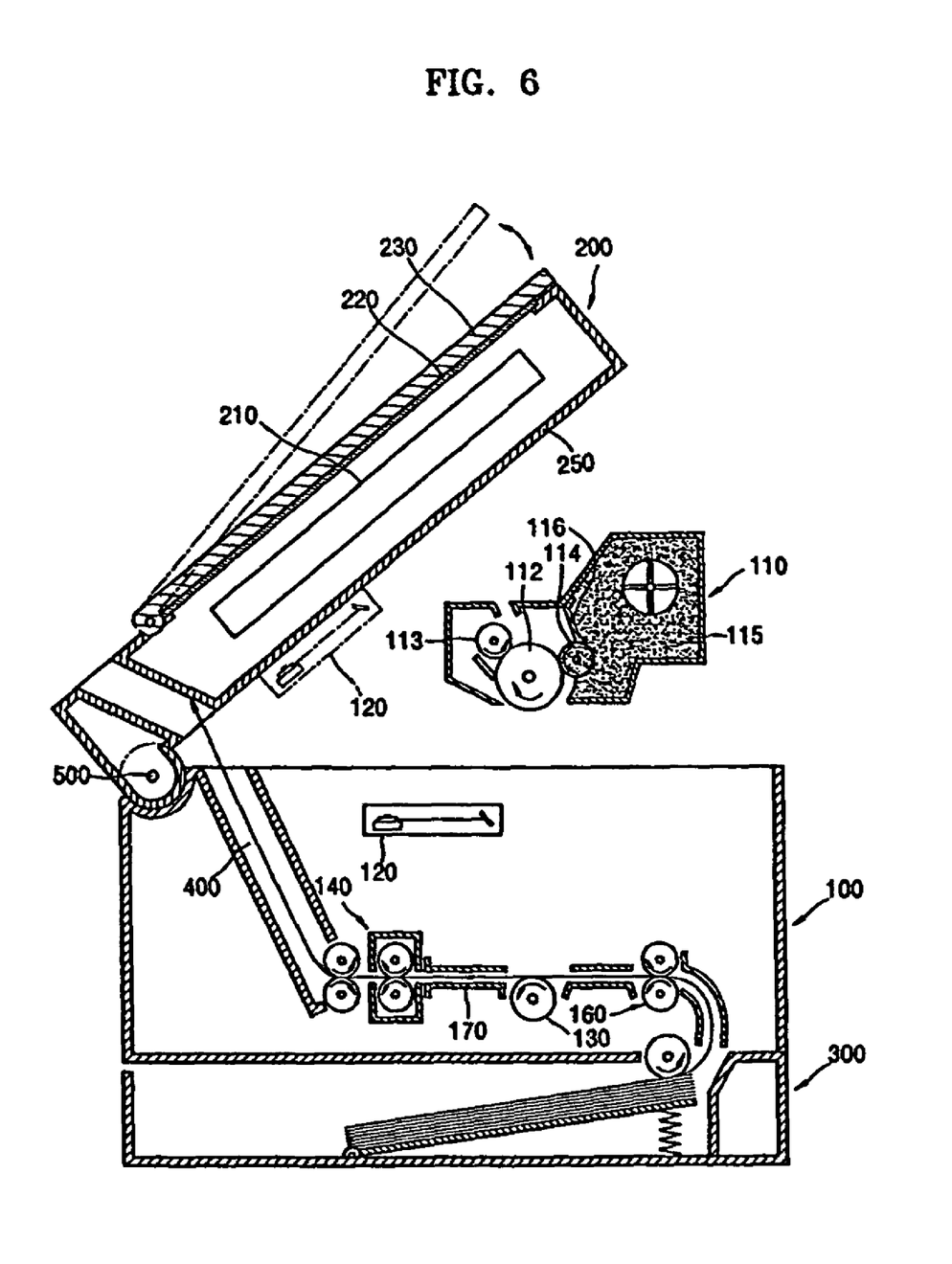
FIG. 6 is a diagram illustrating the operation of the printing apparatus shown in FIG. 5.

FIG. 5 is a structural diagram illustrating a printing apparatus according to still another embodiment of the present general inventive concept, and FIG. 6 is a diagram illustrating the operation of the printing apparatus shown in FIG. 5.

Referring to FIG. 5, a scanning unit 200 is installed at a printing unit 100 to be able to pivot. The printing apparatus of this embodiment is characterized in that a discharged-medium stacking portion 400 on which recoding mediums discharged from the printing unit 100 are stacked, is installed at a side portion of the printing unit 100 in a vertical direction. The discharged-medium stacking portion 400 is disposed at a side at which a hinge 500, that is, the pivot shaft of the scanning unit 200, is positioned. The discharged-medium stacking portion 400 extends upward from a discharge side of a fixing device 140 of the printing unit 100 through the scanning unit 200. Therefore, the transfer path of a recording medium picked up from a recording medium feeding unit 300 has nearly an "L" shape. With the above configuration, the transfer path of a recording medium does not transgress the footprint of the printing apparatus.

In addition, the printing apparatus of this embodiment is characterized in that the scanning unit 200 directly covers the upper side of the printing unit 100. In other words, a lower cover 250 of the scanning unit 200 additionally serves as the upper cover 150 shown in FIGS. 1 and 2. With the above configuration, when the scanning unit 200 is pivoted as shown in FIG. 6, the upper side of the printing unit 100 is opened, a process cartridge 110 can be easily attached/detached to/from the printing unit 100, and a jammed medium can be removed easily. In addition, an exposure device 120 is joined to the scanning unit 200 as shown by dotted lines in FIG. 6, and the exposure device can be pivoted together with the scanning unit 200.

As described above, with the printing apparatuses according to the various embodiments of the present general inventive concept, the following effects can be obtained.

First, since the upper side of the printing unit is opened, a sufficient space can be secured so that the process cartridge can be attached/detached to/from the printing unit, and a jammed medium can be removed.

Furthermore, since the scanning unit is configured to pivot in order to open the upper side of the printing unit, the printing unit is prevented from be opened undesirably.

Moreover, since the attachment/detachment distance of the process cartridge becomes short, additional attachment/detachment structures to attach/detach attaching/detaching the process cartridge to/from the printing apparatus can be omitted. Therefore, in the aspect of manufacturing costs, the printing apparatuses according to the various embodiments of the present general inventive concept are advantageous.

Finally, since the discharged-medium stacking portion is installed between the scanning unit and the printing unit, or at a side of the printing unit in a vertical direction, the transfer path of a recording medium can be limited within the footprint of the printing apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing apparatus having a scanner function, comprising:
   a printing unit to print an image on a recording medium, the printing unit comprising a process cartridge including a photosensitive body, a charge device, and a developing device;
   a scanning unit to read image information from a document sheet, and pivotally installed at an upper side of the printing unit; and
   an upper cover to cover the upper side of the printing unit, the upper cover pivotable together with the scanning unit to open the upper side of the printing unit to allow the process cartridge to be mounted to and dismounted from the printing unit,
   wherein a lower surface of the scanning unit is spaced upward a predetermined distance from the upper cover and a space between a lower surface of the scanning unit and an upper surface of the upper cover forms a discharged-medium stacking portion at which the recording medium discharged from the printing unit is stacked, and
   wherein the printing unit discharges the recording medium from a first end of the upper cover to a second end of the upper cover, and the second end is disposed at a higher elevation than the first end when the scanning unit and the upper cover are pivoted to open the upper side of the printing unit, and
   wherein the scanning unit is pivotally installed such that the upper cover that covers the upper side of the printing unit is pivotable together with the lower surface of the scanning unit.

2. The printing apparatus according to claim 1, wherein a transfer path of the recording medium has a "U" shape.

3. The printing apparatus according to claim 1, wherein a plurality of guide ribs are formed at the lower surface of the scanning unit to guide a recording medium discharged from the printing unit.

4. The printing apparatus according to claim 1, wherein the printing unit comprises:
   a transfer device installed to face the photosensitive body; and
   a fixing device to fix an image onto a recording medium.

5. The printing apparatus according to claim 1, wherein the printing unit further comprises an exposure device to expose the photosensitive body with light to form an electrostatic latent image, the exposure device being installed at the upper cover and pivots together with the upper cover.

6. A printing apparatus having a scanner function, comprising:
   a printing unit to print an image on a recording medium;
   a scanning unit to read image information from a document and pivotally installed at an upper side of the printing unit to pivot toward and away from the printing unit to provide an opening to allow consumables to be placed within the printing unit; and
   an upper cover to cover the upper side of the printing unit, the upper cover pivotable together with the scanning unit to open the upper side of the printing unit, a lower surface of the of the scanning unit being spaced apart from the upper cover such that a space between a lower surface of the scanning unit and an upper surface of the upper cover forms a discharged-medium stacking portion at which recording media discharged from the printing unit are stacked,
   wherein the upper cover of the printing unit is coupled to the scanning unit such that the upper cover is pivotable together with the scanning unit while discharge rollers of the printing unit remain stationary.

7. The printing apparatus of claim 6, further comprising:
   a transfer path within the printing unit to transfer recording mediums from within the printing unit to the discharged-medium stacking portion through an opening between the scanning unit and the upper cover.

8. The printing apparatus according to claim 6, wherein a plurality of guide ribs are formed at the lower surface of the scanning unit to guide a recording medium discharged from the printing unit.

9. The printing apparatus of claim 7, wherein the transfer path has a "U" shape.

10. The printing apparatus according to claim 6, wherein the printing unit comprises:
    a process cartridge including a photosensitive body, a charging device, and a developing device;
    a transfer device installed to face the photosensitive body; and
    a fixing device to fix an image onto a recording medium.

11. The printing apparatus according to claim 10, wherein the printing unit further comprises:
    an exposure device to scan the photosensitive body with light to form an electrostatic latent image.

12. The printing apparatus according to claim 11, wherein the exposure device is installed at the upper cover and pivots together with the upper cover.

13. The printing apparatus according to claim 6, wherein the scanning unit is formed in a flat-bed shape in which a reading unit to read image information from a document sheet is moved.

14. The printing apparatus according to claim 1, wherein the upper cover and the scanning unit pivot with respect to a common hinge.

15. A printing apparatus having a scanner function, the printing apparatus comprising:
    a printing unit to print an image on a recording medium, the printing unit comprising a process cartridge including a photosensitive body, a charge device, and a developing device;
    a scanning unit to read image information from a document sheet, and is pivotally installed at an upper side of the printing unit; and
    an upper cover to cover the upper side of the printing unit and to receive discharged recording media from the printing unit, the upper cover being coupled to a lower surface of the scanning unit and pivotable together with the scanning unit with respect to the printing unit to open the upper side of the printing unit to allow the process cartridge to be mounted to and dismounted from the printing unit,
    wherein the printing unit discharges the recording medium from a first end of the upper cover to a second end of the upper cover, and the second end is disposed at a higher elevation than the first end when the scanning unit and the upper cover are pivoted to open the upper side of the printing unit.

16. The printing apparatus according to claim 3, wherein the plurality of guide ribs are extended in a discharging direction of the recording medium.

17. The printing apparatus according to claim 16, wherein the plurality of guide ribs guide the recording medium when the recording medium has passed through a fixing device such that the recording medium does not directly touch the lower surface of the scanning unit.

18. The printing apparatus according to claim 17, wherein the scanning unit is a flat-bed-type scanning unit in which a reading unit is moved for a reading operation.

19. The printing apparatus according to claim 18, further comprising a line control unit to realize a facsimile function.

20. The printing apparatus according to claim 17, wherein the upper cover is joined to the scanning unit with a combining member.

21. The printing apparatus according to claim 8, wherein the plurality of guide ribs are extended in a discharging direction of the recording medium.

22. The printing apparatus according to claim 21, wherein the plurality of guide ribs guide the recording medium passed through a fixing device such that the recording medium does not directly touch the lower surface of the scanning unit.

23. The printing apparatus according to claim 22, further comprising a line control unit to realize a facsimile function.

* * * * *